(12) United States Patent
Rezgui

(10) Patent No.: US 7,373,832 B2
(45) Date of Patent: May 20, 2008

(54) MINIATURIZED MEMBRANE AND SHELL FOR A PRESSURE MEASURING SENSOR

(75) Inventor: Fadhel Rezgui, Chatillon (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/553,522

(22) Filed: Oct. 27, 2006

(65) Prior Publication Data

US 2007/0095128 A1    May 3, 2007

(51) Int. Cl.
*G01L 7/00*    (2006.01)
(52) U.S. Cl. .............................. 73/715; 73/714; 73/725
(58) Field of Classification Search .................. 73/715, 73/714, 725
See application file for complete search history.

(56) References Cited

U.S. PATENT DOCUMENTS 4,203,327 A    5/1980    Singh

*Primary Examiner*—Andre J. Allen
(74) *Attorney, Agent, or Firm*—James L. Kurka; Jaime Castano

(57) ABSTRACT

Membrane (24) of a shell (20) of a pressure sensor, having an upper and lower chamber (34, 23), wherein the membrane is made by a support wall (36) and a cap (41) having an upper and lower sheets (31, 32), the support wall having a central aperture (33), the support wall separating but for its central aperture the lower from the upper chamber, the lower sheet (32) having a central aperture (38), edges of the central apertures (33, 38) of the support wall (36) and of the lower sheet (32) respectively being welded to one another, peripheries (37) of the upper and lower sheet (31, 32) being welded to one another so that a volume (40) is present between said upper and lower sheets (31, 32), said volume being in the upper chamber (34) and communicating through the central apertures (33, 38) of the support wall (36) and of the lower sheet (32) respectively, with the lower chamber (23).

11 Claims, 1 Drawing Sheet

MINIATURIZED MEMBRANE AND SHELL FOR A PRESSURE MEASURING SENSOR

BACKGROUND OF THE INVENTION

1. Field of the Invention

The invention relates also to a miniaturized deflectable membrane separating a lower chamber containing a clean pressure transmission medium from an upper chamber receiving through an aperture of said upper chamber, a fluid, the pressure of which is to be measured.

The invention relates also to a shell of a pressure sensor containing the upper and lower chamber and the membrane.

2. Description of the Prior Art

A pressure sensor module generally comprises a sensor shell having an aperture for receiving a fluid, the pressure of which is to be measured by the sensor. The shell comprises a separating membrane which can be deflected when a positive or negative pressure is applied by the fluid present at the aperture of the shell. In order to minimize unwanted pressure effects, ideally, such a separator must be "transparent" to pressure. Its stiffness must then be as low as possible. For a given material, the stiffness of the membrane is increasing when its thickness increases and decreases when its area increases. Low stiffness is obtained with large and/or thin membranes. Usually, for reliability and robustness raisons, these membranes are metallic and are thicker than 50 micrometers.

The separating membrane tightly separates an inner closed volume of a lower chamber of the shell from an open volume of an upper chamber of the shell having the aperture. The lower chamber of the shell contains a pressure transmitting medium and a measuring cell. The pressure of the fluid present in the open volume of the shell is then indirectly applied to the measure cell, by means of the membrane and of the transmitting medium, for instance silicon oil. Because of the separating membrane the cell is immerged in the pressure transmitting medium and is then protected from corrosive fluids, the pressure of which is to be measured. The measuring cell is made of two half cents bonded to one another. A hollow part inside the measuring cell allows for a deflection of a diaphragm of the cell. Resistors forming a bridge are mechanically linked, for instance bonded or deposited on a surface of the diaphragm of the measuring cell. When the diaphragm of the cell having the resistors linked on it is deflected by the pressure of the transmitting medium, the resistors are bent. The bending results in a modification of the resistance of the resistors. The resistors may be made of thin film which are bonded or deposited onto the diaphragm. A kind of thin film which is used for the purpose of making resistors, in particular resistors to be used in pressure cells is made of a mix of tantalum (Ta) grains in a nitride of tantalum (NTa).

Bridge excitation in the form of a voltage or current is applied across two opposite nodes of the bridge. These nodes are usually referred to as excitation inputs or bridge drive inputs. The bridge inputs are connected through tight connections to external connections of the measuring cell and then on external connections of the shell.

To get an easily deflectable membrane one uses generally large membranes (more than a centimetre in diameter) or a kind of bellows made by a plurality of walls. The walls of the membrane have together the form of the wall of an accordion. An aperture of the accordion like wall is turned toward the lower chamber so that an inner volume of the bellow is filled with the clean transmitting medium. A drawback of such a construction for the membrane separating the lower chamber from the upper chamber is that necessarily, it can become very long or too large for miniaturized system. In addition, the inner volume of the bellow is great, and so the quantity of the transmitting medium, for instance silicon oil is great too. That makes the signal transmitted from the cell to vary with the variations of the volume of the transmitting medium due to variations of the temperature of the transmitting medium.

SUMMARY OF THE INVENTION

The purpose of the invention is to design a miniaturized and high performance pressure sensor. Since, the sensing cell uses conventional MEMS technology (Miniaturized Electrical and Mechanical System) all efforts have been focused on the encapsulation of such a cell. In particular, one of the key issues is to miniaturized the separating membrane without jeopardizing the meteorological performances of the sensing pressure cell.

Since the displacement of such a separating membrane is very small (a few hundred of micrometers), the quantity of the transmitting medium must be reduced in order to minimize its variations of volume linked with temperature variations.

In known shell of pressure sensors, the shell has an inner upper chamber having an aperture to receive a fluid the pressure of which is to be measured, a lower inner chamber housing a measuring pressure cell having an outer surface, and filled with a pressure transmitting medium. As explained in the prior art section a diameter of the membrane is more than one centimetre so that a surface of he membrane is large enough so that a good deflection is reached. According to the invention the membrane is made of a supporting wall and of a cap. The cap is made of an upper sheet and of a lower sheet, both sheets having a periphery. The supporting wall has a central aperture with edges of the aperture, the supporting wall separates but for the central aperture the lower chamber from the upper chamber. The lower sheet has a central aperture with edges of said aperture of the lower sheet. The edges of the central apertures of the supporting wall and of the lower sheet respectively are tightly directly mechanically linked to one another. The central apertures of the supporting wall and of the lower sheet respectively may also be tightly indirectly mechanically linked to one another through a tubular linking wall having two ends. One end of the linking wall is tightly mechanically linked to the edges of the aperture of the supporting wall and the other end is tightly mechanically linked to the edges of the aperture of the lower sheet of the cap. The peripheries of the upper and lower sheet are tightly linked to one another so that a volume is present between said upper and lower sheet. Said volume is in the upper chamber of the shell and communicates through the central apertures of the support wall and of the lower sheet respectively, with the lower chamber. The pressure transmitting medium is present in the lower chamber and in the inner volume of the cap. When a tubular liking wall is present, the pressure transmitting medium is also present in the tubular linking wall. In the two embodiment of the membrane, with or without tubular linking wall, the membrane has the general shape of a mushroom, the cap being the head of the mushroom and the tubular linking wall being a foot of the mushroom, a length of said foot being equal to 0 when there is no tubular linking wall. Because the cap is made of two sheets mechanically linked to one another at their respective periphery, the distance between the central parts of the two sheets may be varied according to the difference of pressure between an inner volume of the cap and an outer volume of the cap surrounding the cap. This mushroom configuration of the membrane allows a good deflection of the membrane for a surface of it which is less than the one of membranes of prior art.

BRIEF DESCRIPTION OF THE FIGURES

The invention will now be described in greater detail with reference to the accompanying drawings, in which.

EXAMPLES OF PREFERRED EMBODIMENTS

Figure 1:
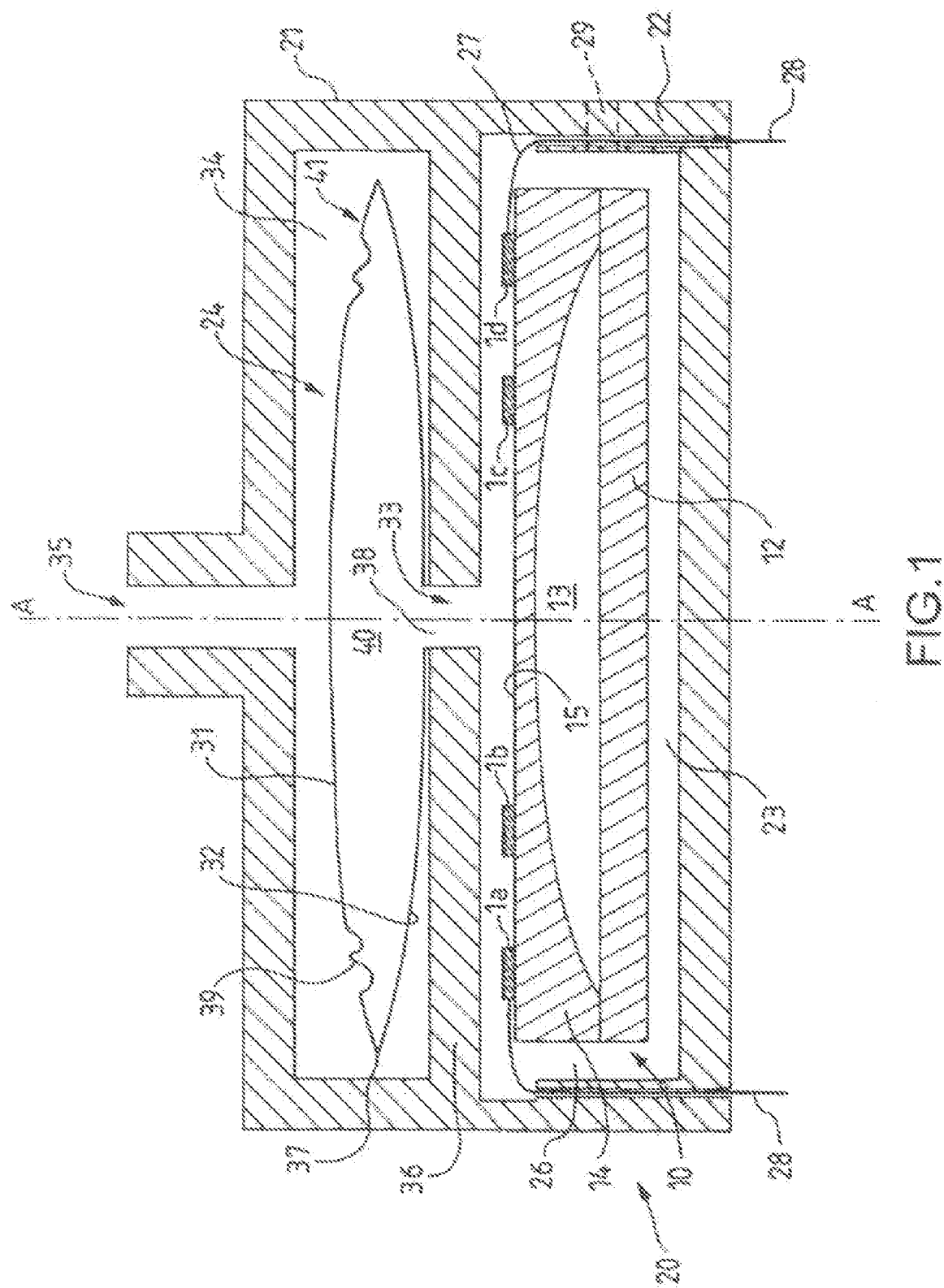
FIG. 1 is a cross sectional schematic view of a pressure sensor shell in an embodiment using a membrane according to the invention, in the form of a bellow having only an upper and a lower sheet mechanically linked to a separating support wall.

The terms upper and lower are used to ease the description of the relative position of the different element. They are true in the drawing, but of course the shell of the pressure sensor may be oriented a different way than vertical.

FIG. 1 is an axial cross section of a shell 20 of a pressure sensor including a sapphire cell 10 known per se. Sapphire cell 10 is made of two half parts, 12 and 14 assembled together. A hollow part 13 is closed inside the assembly 12, 14. The upper part 14 of the assembly is a diaphragm having a two surface 15. The hollow part 13 allows the diaphragm and specially its top outer surface 15 to be deflected when the cell 10 is under pressure. At a reference pressure the top outer surface 15 would be flat. If a pressure is applied, the top outer surface 15 of the diaphragm is deflected. Parts 1a, 1b; 1c, 1d of a thin film are bonded on surface 15. Due to the deflection of the top outer surface 15, parts 1a, 1d are deflected outwardly while parts 1b, 1c of thin film 1 are deflected inwardly. Parts 1a, 1d, form one leg of a bridge and part 1b, 1c form the other leg. The resistances of one leg are then increased and the other one is decreased. The unbalance is measured in a known way and linked to the applied pressure.

Shell 20 is made of two half shells, an upper half shell 21 and a lower half shell 22, tightly assembled together. An inner volume of the shell 20 is divided in two chambers 23 and 34, a lower chamber 23 and an upper chamber 34 by a membrane 24. According to the invention, the membrane 24 is made of a supporting wall 36 perpendicular to an axis AA common to the cell 10 and the shell 20. The support wall 36 separates the lower chamber 23 from the upper chamber 34. The supporting wall 36 has a lower surface in the lower inner chamber 23 and an upper surface in the upper inner chamber 34. The support wall 36 has a central aperture 33. The lower chamber 23 of the shell 20 contains the cell 10. Electrical inner connections 27 and outer connections 28 are provided to deliver electrical power to a bridge of resistors 1a, to 1d and to collect a signal there from indicating the applied pressure. The outer connections 28 are to be connected to a power supply and processing circuit known per se.

The upper chamber 34 has an aperture 35 to receive the fluid, the pressure of which is to be measured. The upper chamber 34 contains an upper surface of the support wall 36 and the membrane 24. By stipulating definition the membrane 24 is composed of its support wall 36 and of a cap 41. The cap 41 is a below made of an upper sheet 31 and of a lower sheet 32. The sheets 31, 32 forming together the cap 41 are welded to one another at a common periphery 37 of said sheets 31, 32 for instance by laser welding The lower sheet 32 of the cap 41 has a central aperture 38. Edges of the central aperture 38 of the cap 41 are rightly joined to edges of the central aperture 33 of the separating support wall 36. Wavelets 329 on the upper sheet 31 ease the deflection of the cap 41 under pressure. In such an embodiment, the value of the pressure transmitted to a transmitting medium is not changed or changed negligibly by a counter pressure of the membrane itself. An inner volume 40 of the cap 41 is defined as the volume limited by the upper and lower sheets 31, 32 and when present by an inner volume of a tubular wall joining the edges of the central apertures 38, 33 of the cap and of the separating support wall 36. An intermediary aperture 29 is joining the lower chamber 23 of the shell 20 to the exterior of the shell 20. Said intermediary aperture 29 is used to introduce the pressure transmitting medium, for instance silicone oil, in a volume 26 of the lower chamber 23 of the shell 20 and in the inner volume 40 of the cap 41. The volume 26 of the lower chamber 23 is the volume which is the difference between a total volume of said lower chamber 23 and the volume of the sapphire cell 10 contains in said lower chamber 23. The filling of the volume 26 of the lower chamber 23 of the shell 20 and of the inner volume 40 of the cap 41 is made under vacuum to prevent bubbles of gas inside said volumes 26, 40. The intermediary aperture 29 is then salted. This is the reason why the aperture 29 is qualified "intermediary" and is represented FIG. 1 in doted lines. The pressure transmitting medium is present in the volume 26, all around an outer surface of the sapphire cell 10 and in the inner volume 40 of the cap 41. The volume of the pressure transmitting medium is the sum of the volume 26 which is the volume of the lower chamber 23 which is not occupied by the sapphire cell 10 and of the inner volume 40 of the cap 41. It is to be noted that the dimension in height between the two sheets 31, 32 of the cap 41 is represented at a greater scale than the dimensions of the diameter of the shell 20 and of the sapphire cell 10 to achieve an easier understandable figure. It is the same for the height (thickness) of the separating wall 36. In one embodiment of the invention, at the maximum of the distance between the two sheets 31, 32, the height is 2 mm and the diameter at the periphery of the sheets 31, 32 is about 6 mm. Hence the inner volume 40 of the cap 41 is about 100 cubic millimetres.

The functioning of the shell 20 is the following. The pressure to be measured is received at the outer aperture 35 of the upper chamber 34 of the shell 20. The pressure is transmitted to the sapphire cell 10 through the cap 41 an the pressure transmitting medium present in the inner volume 26 surrounding the cell 10, and in the inner volume 40 of the cap 41. The surface 15 of the upper part 14 of the cell 10 is deflected. The deflection fosters a modification of the value of resistors 1a to 1d of the bridge of resistors. An electric signal is modified according to the deflection resulting from the measured pressure. Said signal is sent to processing circuit (not shown) through electrical connections 27, 28.

Some advantages of the invention will now be explained. First, because there is a rigid support wall 36 between the two chamber 23 and 34 of the shell 20, a lower surface of the support wall 36 can be very near the top surface 15 of the cell 10. There is no risk that due to the movement of the cap 41, short circuit occurs between the electrical connections 27, 28 and the cap 41. Hence, the distance between the outer surface of cell 10 and an internal surface of the lower chamber 23 may be as small as 100 μm and even below. If D is the diameter of the sapphire cell 10, h its height and W the distance between the inner surface of the lower chamber 23 and the outer surface of the cell 10, it may be said in a first approximation that the volume 26 V is equal to the product of the outer surface of the cell 10 and of the distance W.

$$\text{That is } V = \pi DW\left(\frac{D}{2} + h\right)$$

In one embodiment for which D is less than 7 mm, about 6 mm, h is about 4 mm and W is less than 100 μm all around an outer surface of the cell 10, the volume 26 was less than 200 cubic millimetres. So the total volume of the transmitting medium is less than 300 cubic millimetres. Due to the volume of the transmitting medium being relatively small, the variations of volume of the transmitting medium, in a wide range of temperatures, can be absorbed by deflection of the cap 41 and there is no need to compensate the effect of temperature in the processing circuit. Also the overall dimensions of the shell 20 are miniaturised so that an outer diameter of the shell is less than 8 mm and a total length of it is less than 15 mm.

Such a shell 20 which has been described above, is for use for instance, in drilled well, for instance for oil or oil researchers.

The embodiments described above are exemplary embodiments, the invention being defined by the appended claims.

The invention claimed is:

1. A miniaturized membrane of a shell of a pressure sensor,
   the shell having an inner upper chamber having an aperture to receive a fluid the pressure of which is to be measured, a lower inner chamber filled with a pressure transmitting medium,
   wherein the membrane is made of
   a supporting wall having a central aperture with edges of the aperture, the supporting wall separating but for the central aperture the lower inner chamber from the upper inner chamber, and
   a cap made of an upper sheet and of a lower sheet, both sheets having a periphery, the lower sheet having a central aperture with edges of said aperture of the lower sheet, the edges of the central apertures of the supporting wall and of the lower sheet respectively being tightly mechanically linked to one another, the periphery of the upper and lower sheet being tightly linked to one another so that an inner volume is present between said upper and lower sheet.

2. The miniaturized membrane of a shell of a pressure sensor according to claim 1 wherein the upper sheet has wavelets.

3. The miniaturized membrane of a shell of a pressure sensor according to claim 1 wherein the peripheries of the upper and lower sheets are linked to one another by means of laser welding.

4. The miniaturized membrane of a shell of a pressure sensor according to claim 1 wherein the membrane is less than seven mm in diameter.

5. A shell of a pressure sensor having
   an inner upper chamber having an aperture to receive a fluid the pressure of which is to be measured,
   a lower inner chamber filled with a pressure transmitting medium, wherein the shell has a membrane according to claim 1, said volume of the cap being in the upper chamber of the shell and communicating through the central apertures of the support wall and of the lower sheet respectively, with the lower chamber so that the pressure transmitting medium is present in the lower inner chamber and in the inner volume of the cap.

6. The shell of a pressure sensor according to claim 5 wherein the lower inner chamber of the shell is housing a measuring cell said pressure transmitting medium being all around an outer surface of said cell.

7. The shell of a pressure sensor according to claim 6 wherein, a distance between the outer surface of the cell and an inner surface of the lower inner chamber said surface of the lower inner chamber including a lower surface of the support wall of the cap, is less than 100 μm all around the outer surface of the cell.

8. The shell of a pressure sensor according to claim 4 having an outer diameter less than 8 mm and a total length less than 15 mm.

9. The shell of a pressure sensor according to claim 5 having an outer diameter less than 8 mm and a total length less than 15 mm.

10. The miniaturized membrane of a shell of a pressure sensor according to claim 2 wherein the peripheries of the upper and lower sheets are linked to one another by means of laser welding.

11. The miniaturized membrane of a shell of a pressure sensor according to claim 10 wherein the membrane is less than seven mm in diameter.

* * * * *